Figure 6:
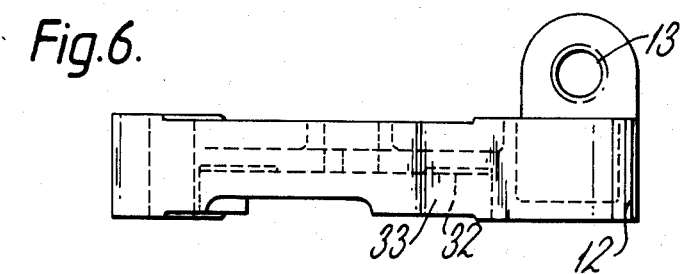

United States Patent [19]

Tavener

[11] Patent Number: 4,633,733
[45] Date of Patent: Jan. 6, 1987

[54] RATCHET MECHANISM

[75] Inventor: John W. Tavener, Stokesley, England

[73] Assignee: Imperial Chemical Industries PLC, London, England

[21] Appl. No.: 780,020

[22] Filed: Sep. 23, 1985

[30] Foreign Application Priority Data

Oct. 10, 1984 [GB] United Kingdom ............... 8425549

[51] Int. Cl.⁴ .............................................. G05G 5/06
[52] U.S. Cl. ...................................... 74/533; 74/537; 74/576
[58] Field of Search ............... 74/540, 533, 537, 538, 74/576, 575

[56] References Cited

U.S. PATENT DOCUMENTS

| 2,296,675 | 9/1942 | Jandus ................................... 74/537 |
| 2,405,956 | 8/1946 | Jandus ................................... 74/537 |
| 3,328,079 | 6/1967 | Byczkowski et al. . |
| 3,525,272 | 8/1970 | Olson .................................... 74/533 |
| 4,559,262 | 12/1985 | Cogswell et al. . |

FOREIGN PATENT DOCUMENTS

| 202475 | 3/1959 | Austria . |
| EP056703 | 7/1982 | European Pat. Off. . |
| 1497261 | 4/1969 | Fed. Rep. of Germany . |
| 2162090 | 7/1972 | Fed. Rep. of Germany . |
| 1269430 | 7/1961 | France . |
| 2162508 | 7/1973 | France . |

Primary Examiner—Larry I. Schwartz
Attorney, Agent, or Firm—Cushman, Darby & Cushman

[57] ABSTRACT

A ratchet mechanism comprising a disc rotatable on a pivot pin, said disc being provided with radially disposed ratchet teeth on a face of the disc, an engagement plate provided with channels corresponding to and engageable with the teeth of the disc, the ratchet face of the rotatable disc being biassed into engagement with the ratchet face of the plate, and means for disengaging the ratchet disc from the plate. The mechanism is particularly suitable for the construction of a hand brake for an automotive vehicle using thermoplastics as the material of construction.

8 Claims, 15 Drawing Figures

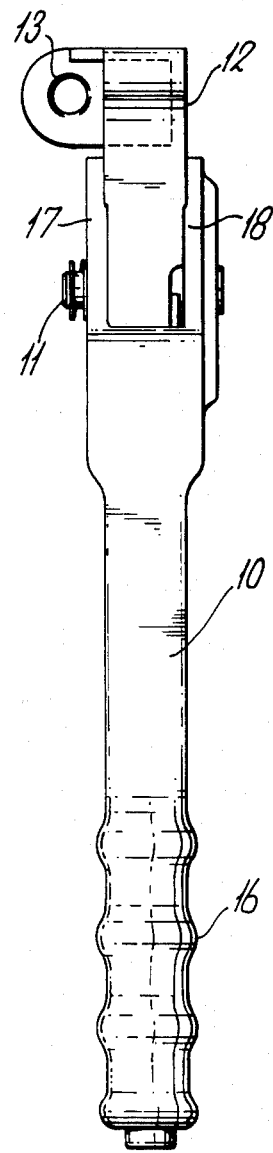
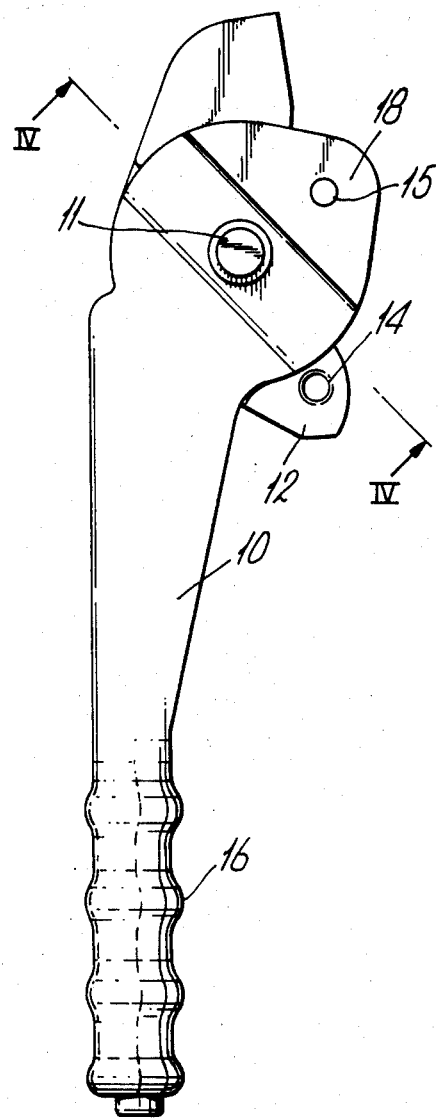

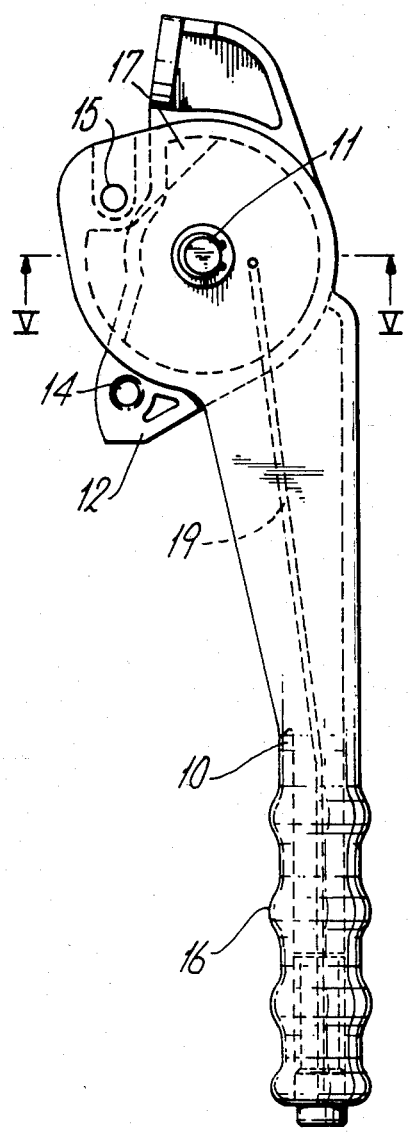
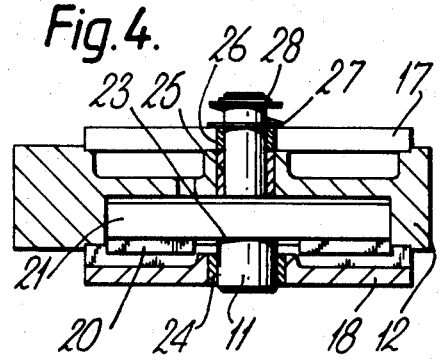
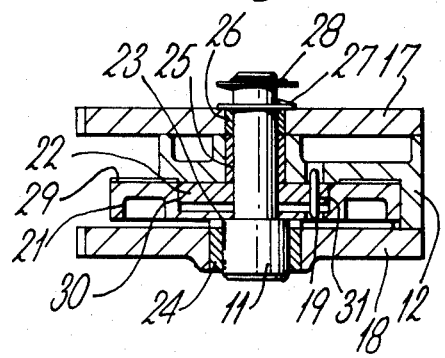

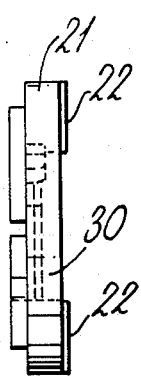
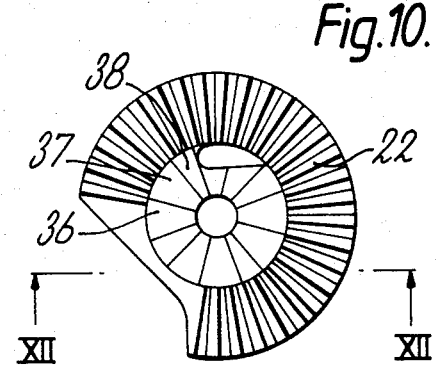
Fig.9.   Fig.10.
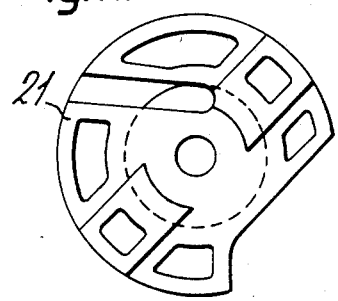
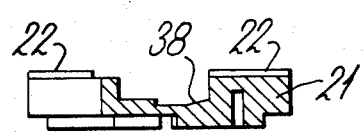
Fig.11.   Fig.12.
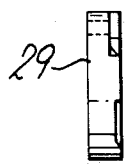
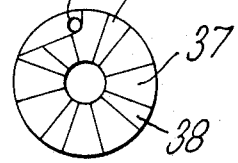
Fig.13.   Fig.14.
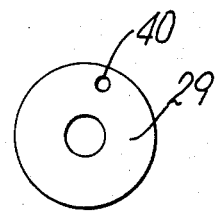
Fig.15.

RATCHET MECHANISM

This invention relates to a ratchet mechanism.

According to the invention there is provided a ratchet mechanism comprising a disc rotatable on a pivot pin, said disc being provided with radially disposed ratchet teeth on a face of the disc, an engagement plate provided with channels corresponding to and engageable with the teeth of the disc, the ratchet face of the rotatable disc being biassed into engagement with the ratchet face of the plate, and means for disengaging the disc from the plate.

The ratchet mechanism of the present invention is particularly suitable for construction from plastics materials, such as those known as being suitable for engineering applications.

Whilst the ratchet mechanism can be constructed from metal the use of a plastics material gives economies in weight which make it a particularly useful component in applications where weight is important such as in the automotive field. The ratchet mechanism can be used as the operative mechanism in, for example, a hand-brake or a seat recline mechanism. When used in such mechanism the weight saving is maximised by making all the components, as far as is practicable, from a plastics material. Additional advantages are obtained in such circumstances in that the component pieces do not need painting and, more importantly, assembly of the components can be achieved with substantial cost savings because, with appropriate design, riveting can be avoided.

Particularly suitable materials are the mineral-filled and glass-fibre-reinforced plastics such as glass-fibre-reinforced polyamides, polyoxymethylenes and polyesters. Preferred materials of this type are granules in which the fibres extend longitudinally of the granule, particularly products as described in European Patent Publication No. 56703.

The radially disposed ratchet teeth are preferably disposed on an essentially planar face of the ratchet. However, this is not essential and other dispositions of the ratchet teeth, such as on a frustro-conical surface, are possible. It is essential that whatever arrangement is chosen for the ratchet teeth, that a corresponding mating surface must be provided on the engagement plate. For most purposes a planar disposition is both adequate and more convenient.

The means for biassing the mating faces of the ratchet mechanism into engagement may be any conventional means but it is preferable to use a spring in compression. Conveniently, a spring may be provided on the shaft of a pivot pin, the head of which is provided with shoulders and the base of which is adapted to receive a retaining means, such as a circlip. The mating parts may then be biassed towards each other by the shoulders of the pivot pin on one side of the assembly and the spring in compression on the opposite side.

The means for disengaging the mating surfaces preferably comprises a release disc provided with at least one inclined surface on a face of the disc which corresponds with an inclined surface provided on the rotatable ratchet disc or the engagement plate and being situated between the rotatable ratchet disc and the engagement plate whereby rotation of the release disc causes it to ride upon the corresponding inclined surface of the rotatable disc or the engagement plate to separate the rotatable ratchet disc and the engagement plate.

Accordingly there is further provided a ratchet mechanism comprising a disc rotatable on a pivot pin, provided with radially disposed ratchet teeth on a face of the disc, an engagement plate provided with channels corresponding to and engageable with the teeth of the disc, the ratchet face of the rotatable disc being biassed into engagement with the ratchet face of the plate, and means for disengaging the ratchet disc from the plate comprising a release disc situated between the rotatable ratchet disc and the engagement plate and having at least one inclined surface on a face of the disc corresponding with an inclined surface provided on the rotatable ratchet disc or the engagement plate, means for rotating the release disc independently of the rotatable ratchet disc whereby the corresponding inclined surfaces are cooperable to separate the rotatable disc from engagement with the plate. It is preferred that the release disc is also rotatable on the pivot pin and is situated in a recess in either the rotatable disc or the engagement plate. The means for rotating the release disc independently of the rotatable ratchet disc may be a member passing freely through access in the rotatable disc and/or the engagement plate which member locates engagingly with the release disc and is able to rotate it to cause the corresponding inclined surfaces to co-operate resulting in separation of the two ratchet surfaces. It is not essential that the rotatable release disc has a circular perimeter. The essential requirement is that the disc is capable of being rotated so that its inclined surface co-operates with the corresponding surface provided whereby the distance between the surface of the disc remote from that provided with the inclined surface and the corresponding inclined surface on the ratchet disc or the engagement plate is increased sufficiently to disengage the ratchet faces on the ratchet disc and the engagement plate and to allow rotation of the ratchet disc clear of the engagement plate. For this purpose the nature of the perimeter of the rotatable disc is immaterial providing that it is not prevented from being rotatable.

In a preferred embodiment of the invention there is provided a hand-brake for an automotive vehicle comprising a disc rotatable on a pivot pin, said disc being provided with radially disposed ratchet teeth on the face of the disc, a bracket provided with means for securement to the vehicle and with channels corresponding to and engageable with the ratchet teeth of the disc, the corresponding faces being biassed into engagement, means for releasably disengaging the ratchet disc from the bracket and a lever arm pivoted on the pivot pin, the rotatable disc and bracket being contained within opposing walls provided on the lever arm and means being provided to locate the rotatable disc in a wall of the lever arm when the rotatable disc is disengaged from the bracket.

Preferably, the means for disengaging the rotatable ratchet disc from the ratchet face of the bracket comprises a release disc, situated between the ratchet disc and the bracket, rotatable on the pivot pin independently of the ratchet disc and having at least one inclined surface corresponding with a mating surface provided on the ratchet disc or the engagement plate so that rotation of the release disc relative to the ratchet disc causes the release disc to co-operate with the mating inclined surface of the ratchet disc or the engagement plate whereby the release disc biasses the ratchet disc away from engagement with the bracket.

The means for rotating the release disc independently of the rotatable ratchet disc may be a member, such as a rod, which passes through the rotatable ratchet disc and/or the bracket to a location in the release disc. Rotation of the release disc is then brought about by movement of the rod. Conveniently the end of the rod remote from that located in the release disc may be attached to a spring-loaded push button in the lever arm so that depression of the push button causes rotation of the release disc and disengagement of the ratchet disc from the corresponding ratchet face on the bracket.

Provision may also be made for a fail-safe device in the event of a fire or a high temperature sufficient to render the plastic handbrake inoperative. Such provision consists of a fusible element which changes its mechanical properties at a desired temperature and allows a preloaded spring to apply a force on the handbrake cable and in so doing producing a bend or kink in the cable and thereby locking the cable in its position to secure the car against rolling. This fail safe device can be fitted to the floor of the vehicle in the normal cable path as close to the handbrake as possible. The construction can be of tube or plate with the fusible element positioned so that it is located in the interior of the vehicle when the brake is fitted to the vehicle. The device will have sufficient clearance for the cable to pass through with cable end fittings and allow for normal operation of the handbrake. One method of construction is a tube with an internal plunger held back against a strong spring by a similar plastic to that of the handbrake and a hole through the tube at right angles to its axis which the cable passes through in front of the plunger.

On operation of the device the plunger which has a rounded end is released by the fusible material and is forced on to the cable by the spring thus bending the cable into the tube and trapping it in its position.

One aspect of the invention will now be described with reference to the accompanying drawings which illustrate the ratchet mechanism and its incorporation in a car hand-brake assembly.

In the accompanying drawings FIG. 1 is a plan view of a car hand-brake incorporating a ratchet device according to the invention, FIGS. 2 and 3 are side views of the car hand-brake shown in FIG. 1, FIG. 4 is a section on the line A—A of FIG. 2, FIG. 5 is a section on the line A—A of FIG. 3.

Figure 7:
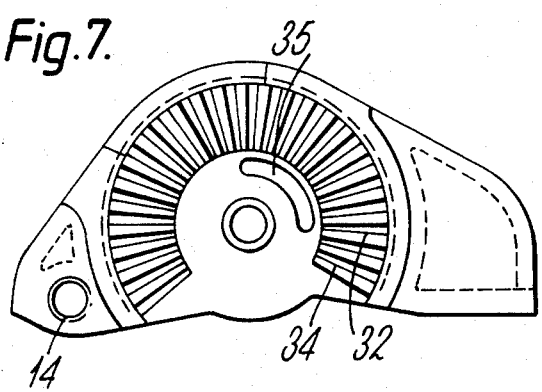
Figure 8:
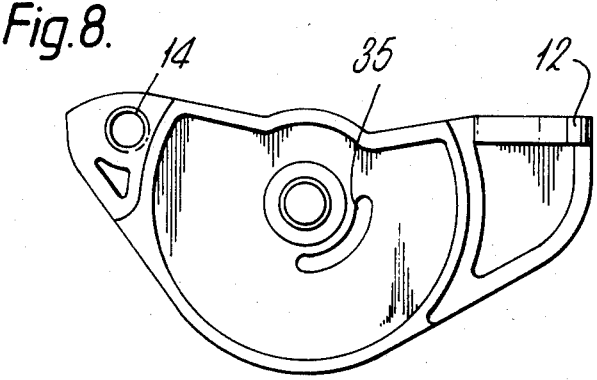

FIGS. 6, 7 and 8 are plan and elevational views of a bracket used in the hand-brake assembly, FIGS. 9, 10 and 11 are plan and elevational views of a ratchet disc used in the assembly, FIG. 12 is a sectional view on the line A—A of FIG. 10, FIGS. 13, 14 and 15 are plan and elevational views of a release disc used in the assembly.

In FIGS. 1, 2 and 3 a hand-brake lever 10 is pivotally connected through pivot pin 11 to bracket 12. Fixing holes 13 and 14 are provided for securing the bracket to the floor of the car. Holes 15 are provided for attachment to the brake cable (not shown). Hand-brake lever 10 is a hollow construction provided with a tubular hand-grip 16 at one end of the lever and having a pair of spaced walls 17 and 18 at the other end of the lever. The spaced walls 17 and 18 are adapted to receive the ratchet mechanism and the pivot pin 11 passing through the walls 17 and 18. The hand-grip end of the lever is provided with a spring-loaded push button in the tubular section which is operatively connected to rigid rod 19 for releasable engagement with the ratchet mechanism.

The sections in FIGS. 4 and 5 show the components of the ratchet mechanism in more detail. A ratchet disc 21 having a ratchet face 22 is biassed against a corresponding ratchet face provided on an internal face of bracket 12 by the shoulders 23 of pivot pin 11 which passes through both walls, 17 and 18, of lever 10. A rectangular section key 20 (shown in section in FIG. 5) on the surface of the disc opposite to that having the ratchet face is provided for engagement in a corresponding recessed slot in wall 18 of the lever. The pivot pin 11 moves slidably in bushes 24, 25 and 26 and is retained in position by abutment of the shoulders 23 at the head of the pin against disc 21 and by provision of a spring washer 27 retained by a circlip 28 in the tail of the pin. The spring washer 27 is seated on the outer surface of wall 17 of lever 10 and is held in compression against the wall by circlip 28 thus biassing the ratchet face 22 of the ratchet disc 21 against the corresponding ratchet face on the internal face of bracket 12. A release disc 29 is situated in a recess 30 of the ratchet disc, contacting faces of the release disc and ratchet disc respectively being provided with corresponding inclined surfaces. The end of push rod 19 passes through ratchet disc 21 to connect with a channel 31 provided in release disc 28.

The details of the bracket 12 are shown in FIGS. 6, 7 and 8. The inner surface 32 of recess 33 provided in bracket 12 is formed with radially disposed ratchet teeth 34. Channel 35 is provided to receive the end of rod 19 connected to the spring-loaded push button of the lever 10.

The details of the ratchet disc 21 are shown in FIGS. 9, 10, 11 and 12. Disc 21 has a ratchet face 22 corresponding in profile to the ratchet face of surface 32. Recess 30 in ratchet disc 21 is provided with a profile surface generally represented by 36 corresponding to a surface provided on the release disc 29. The profiled surfaces have corresponding flat 37 and inclined 38 portions so that the corresponding surfaces of the ratchet disc and the release disc may mate or are caused to move apart on rotation of the release disc relative to the ratchet disc as the inclined surfaces engage.

Details of the release disc are shown in FIGS. 13, 14 and 15. Release disc 29 has a profiled surface generally represented by 39 corresponding with that of profiled surface 36 in the recess 30 of ratchet disc 21. Aperture 40 is adapted to receive the end of rod 19.

In the position shown in FIG. 3 the ratchet face of the ratchet disc 21 is in engagement with the corresponding ratchet face 32 on the bracket. The lever may be raised to cause the hand-brake cable to engage the hand-braking system. As the lever is raised the engagement of the rear raised surface 20 of the ratchet disc within the corresponding slotted recess of the wall 18 of the lever causes ratchet face 22 to rotate over fixed ratchet face 32 against the bias provided by the spring washer. When the brake is in the engaged position the lever is held in position on a large number of mating ratchet teeth in corresponding channels. To release the handbrake from engagement the push rod is depressed causing rotation of the release disc 20 and consequent movement of profiled surface 36 towards wall 18 causing separation of ratchet faces 22 and 32 by a distance sufficient to enable the ratchet disc to be rotated clear of the bracket as the lever 16 is lowered to release the brake.

Assembly of the hand-brake mechanism is extremely simple and requires only that the release disc 29 is located in the ratchet disc 21, and the ratchet disc is located in the bracket with the push rod 19 engaged into the hole 40 of the release disc. This sub-assembly is inserted between the opposing walls 17 and 18 of the lever arm engaging the slot recess in the lever arm wall with the key section 20 on the ratchet disc, simultaneously the push rod is entered down the tubular lever arm 10. The centre pivot pin 11 is pushed through the arm and discs, and the spring washer and circlip fitted to retain the pivot pin in position. Finally, the end of the push rod is connected to the push button assembly in the end of the lever arm.

I claim:

1. A ratchet mechanism comprising a disc rotatable on a pivot pin, said disc being provided with radially disposed ratchet teeth on a face of the disc, an engagement plate provided with channels corresponding to and engageable with the teeth of the disc, the ratchet face of the rotatable disc being biassed into engagement with the ratchet face of the plate, and means for disengaging the ratchet disc from the plate comprising a release disc situated between the rotatable ratchet disc and the engagement plate having at least one inclined surface on a face of the disc corresponding with an inclined surface provided on the rotatable ratchet disc or the engagement plate, means for rotating the release disc independently of the rotatable ratchet disc whereby the corresponding inclined surfaces are cooperable to separate the rotatable disc from engagement with the plate.

2. A ratchet mechanism according to claim 1 in which the release disc is rotatable on the pivot pin.

3. A ratchet mechanism according to claim 1 in which the rotatable ratchet disc is biassed towards the engagement plate by a spring in compression retained on the shaft of the pivot pin.

4. A hand-brake for an automotive vehicle comprising a disc rotatable on a pivot pin, said disc being provided with radially disposed ratchet teeth on the face of the disc, a bracket provided with means for securement to the vehicle and with channels corresponding to and engageable with the ratchet teeth of the disc, the corresponding faces being biassed into engagement, means for releasably disengaging the ratchet disc from the bracket and a lever arm pivoted on the pivot pin, the rotatable disc and bracket being contained within opposing walls provided on the lever arm and means being provided to locate the rotatable disc is disengaged from the bracket wherein the means for disengaging the rotatable ratchet disc from the ratchet face of the bracket comprises a release disc, situated between the ratchet disc and the bracket, rotatable on the pivot pin independently of the ratchet disc and having at least one inclined surface corresponding with a mating surface provided on the ratchet disc or the engagement plate so that rotation of the release disc relative to the ratchet disc causes the release disc to co-operate with the mating inclined surface of the ratchet disc or the engagement plate whereby the release disc biasses the ratchet disc away from engagement with the bracket.

5. A hand-brake according to claim 4 characterised in that there is provided means for rotating the release disc relative to the ratchet disc comprising a member passing through the ratchet disc and/or the bracket and being engageable with the release disc.

6. A hand-brake according to claim 4 wherein the member is a rod engageable with the release disc and operatively connected to a push button in the lever arm.

7. A hand-brake according to claim 4 in which the lever arm, the ratchet disc and the release disc are rotatable on the pivot pin and the ratchet disc is biassed against the engagement plate by a spring in compression retained on the shaft of the pivot pin.

8. A hand brake according to claim 7 which includes means for locking the cable in position which means becomes operable when the hand brake is subject to fire conditions.

* * * * *